(12) United States Patent  (10) Patent No.: US 8,130,102 B1
Nguyen  (45) Date of Patent: *Mar. 6, 2012

(54) ADVANCED FOOD AND OR DRINK ORGANIZATION AND OR HANDLING SYSTEM

(76) Inventor: Thu Hien Nguyen, Clarksville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/046,919

(22) Filed: Mar. 14, 2011

Related U.S. Application Data

(63) Continuation of application No. 11/692,141, filed on Mar. 27, 2007, now Pat. No. 7,907,054.

(51) Int. Cl.
*G08B 13/14* (2006.01)

(52) U.S. Cl. .................. 340/572.1; 340/584; 340/585; 340/586; 340/588; 340/3.1; 340/539.1; 340/539.11

(58) Field of Classification Search ............... 340/572.1, 340/584, 585, 586, 588, 3.1, 539.1, 539.11
See application file for complete search history.

(56) References Cited

U.S. PATENT DOCUMENTS 7,196,625 B1 * 3/2007 Nguyen .................... 340/572.1
7,292,146 B1 * 11/2007 Nguyen .................... 340/572.1

* cited by examiner

*Primary Examiner* — Daryl Pope
(74) *Attorney, Agent, or Firm* — Garcia-Zamor IP Law; Ruy M. Garcia-Zamor

(57) ABSTRACT

An advanced food and/or drink organization and/or handling system that greatly facilitates food management and handling to help streamline household operations as relate to foods and related functions and events.

20 Claims, 1 Drawing Sheet

ADVANCED FOOD AND OR DRINK ORGANIZATION AND OR HANDLING SYSTEM

CROSS REFERENCE TO RELATED APPLICATION

This application claims priority to and is a continuation of U.S. patent application Ser. No. 11/692,141, Mar. 7, 2007, invented by Thu H. Nguyen, and entitled "Advanced Food and/or Drink Organization and/or Handling System", which is a continuation in part of U.S. patent application Ser. No. 11/422,282, filed Jun. 5, 2006, now U.S. Pat. No. 7,292,146, invented by Thu H. Nguyen, and entitled "Advanced Food and/or Drink Organization and/or Handling System", which claims priority to and benefit of U.S. patent application Ser. No. 10/972,573, filed Oct. 24, 2004, now U.S. Pat. No. 7,196,625, invented by Thu H. Nguyen, and entitled "Advanced Food and/or Drink Organization and/or Handling System", which claims priority to and benefit of U.S. Provisional Patent Application 60/515,054, filed Oct. 27, 2003, invented by Thu H. Nguyen, and entitled "Advanced Food and/or Drink Organization and/or Handling System", each of the above-identified applications is hereby incorporated by reference herein as if fully set forth in its entirety.

BACKGROUND

The present invention relates generally to food handling and, more specifically, to an advanced food management system and method. Conventional refrigerators are used to store food and drink items which often spoil and remain unnoticed and/or unused due to the number of items packed in the refrigerator. Ensuring that items in a refrigerator are used in a timely and creative fashion requires manually going through a refrigerator and examining each item for freshness.

It would be advantageous to provide an advanced food management system and method that overcomes many of the difficulties encountered in conventional food storage.

SUMMARY

Briefly speaking, one embodiment of the present invention is directed to a method of handling and/or organizing food and/or drink. The method includes the steps of: providing a refrigerator and an associated processor in communication with a data entry device; placing an item of food and/or drink in the refrigerator; communicating data corresponding to the item via a bar code reader in communication with the associated processor; automatically monitoring an expected period of usefulness for the item by the associated processor; entering data into the associated processor regarding an upcoming food shopping trip and an expected date of a subsequent trip; and the processor identifies those items that may reach the end of their expected period of usefulness between the two shopping trips.

In another aspect, the present invention is directed to a method of handling and/or organizing food and/or drink. The method includes the steps of: providing a refrigerator and an associated processor in communication with a data entry device; placing an item of food and/or drink in the refrigerator; entering data corresponding to the item via the data entry device; entering date data corresponding to the item via the data entry device; and monitoring an expected period of usefulness for the item of food and/or drink by the associated processor.

In another aspect, the present invention is directed to a method of handling and/or organizing food and/or drink. The method includes the steps of: providing a refrigerator and an associated processor in communication with a data entry device; placing an item of food and/or drink in the refrigerator; entering data corresponding to the item via the data entry device; and monitoring an expected period of usefulness for the item of food and/or drink by the associated processor; sending at least one notification email when the item is near the expected period of usefulness.

In a separate embodiment, the present invention is directed to a method of handling and/or organizing food and/or drink, including: providing a refrigerator and an associated processor in communication with a data entry device; placing an item of food and/or drink in the refrigerator; communicating data corresponding to the item via a bar code reader in communication with the associated processor; automatically monitoring at least one grocery data site for a coupon and/or sale relating to the item.

In a separate embodiment, the present invention is directed to a method of handling and/or organizing food and/or drink, comprising the steps of: providing a refrigerator and an associated processor in communication with a data entry device; placing an item of food and/or drink in the refrigerator; entering data corresponding to the item via the data entry device; entering genre data corresponding to a genre of food for which a meal is to be made; searching through recipes by the associated processor to identify recipes within the genre of food that include at least some items which are within the refrigerator; selecting at least one recipe for the meal; automatically identifying any missing ingredients; and automatically monitoring at least one grocery data site for a coupon and/or sale relating to any missing ingredients.

In a separate embodiment, the present invention is directed to a method of handling and/or organizing food and/or drink, including: providing a refrigerator and an associated processor in communication with a data entry device; placing an item of food and/or drink in the refrigerator; entering data corresponding to the item via the data entry device; monitoring an expected period of usefulness for the item of food and/or drink by the associated processor; automatically monitoring at least one grocery data site for a coupon and/or sale relating the item when the item is nearing the end of its expected period of usefulness.

BRIEF DESCRIPTION OF THE DRAWINGS

The foregoing Summary, as well as the following detailed description of preferred embodiments of the present invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE PREFERRED EMBODIMENTS OF THE INVENTION

Figure 1:
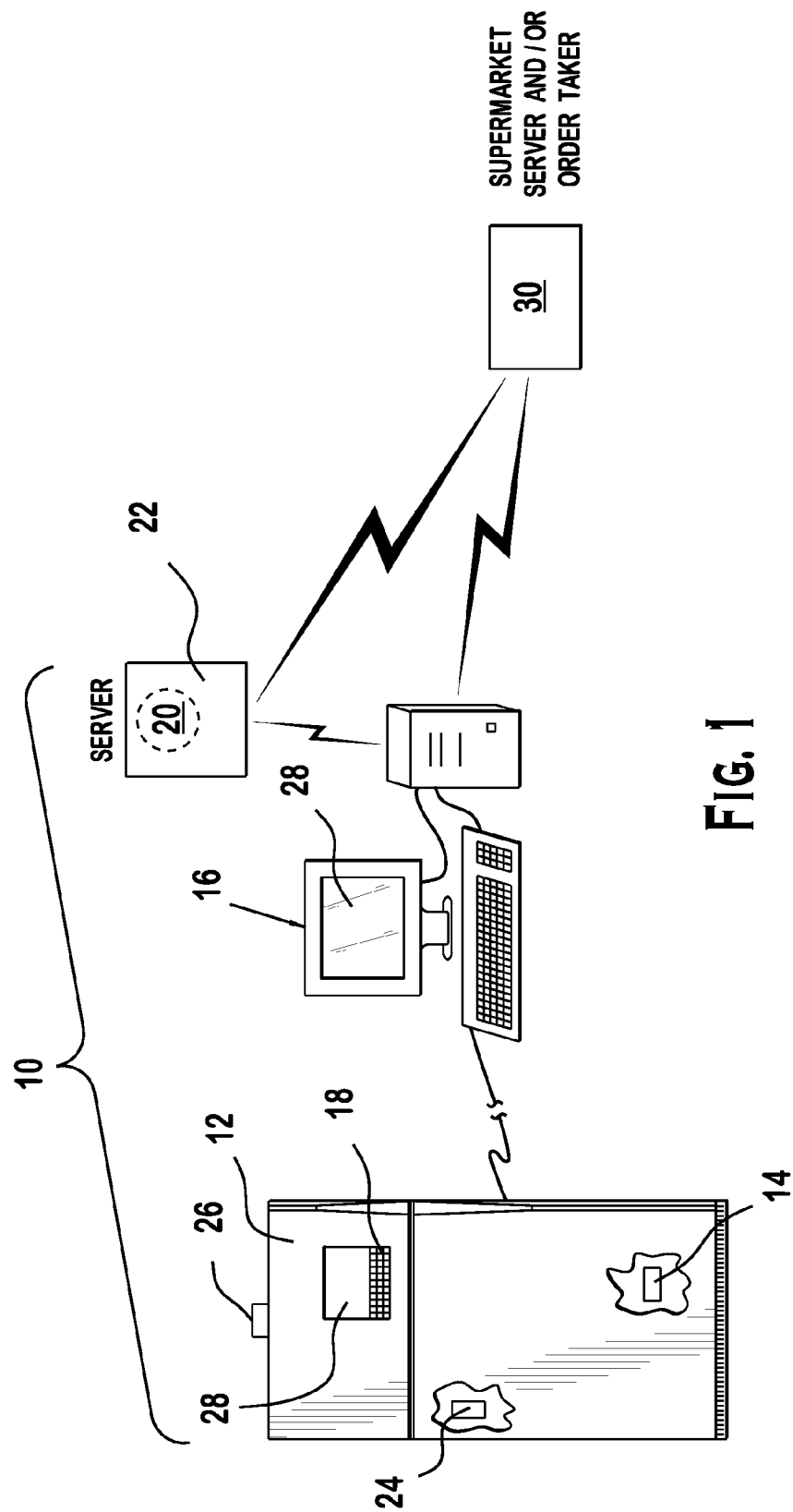
FIG. 1 is a schematic diagram of a system according to a preferred embodiment of the present invention.

The words "a" and "one" are defined to include one or more of the referenced item unless specifically stated otherwise. The term "data entry device" as used in the claims and in the corresponding portions of the specification, means "any one of a keyboard, a numeric pad, a separate computer or processor, a bar code reader, a touch pad, a touch sensitive screen, a voice recognition system, or any other known method of entering data into a processible format, such as that used by computer processors and personal computers". While many embodiments of the present invention will be described below, those of ordinary skill in the art will appreciate from this disclosure that any of the steps or system components described in one embodiment can be combined with any of the other described embodiments.

Referring to FIG. 1, wherein like numerals indicate like elements throughout, the system 10 of the present invention preferably provides a "smart" refrigerator 12 that facilitates the monitoring of the freshness of foods and/or drinks contained therein. The refrigerator 12 preferably includes onboard circuitry 14, such as a PC processor, and/or is in communication, via a wireless connection or a hard wired connection, to a separate computer 16. Alternatively, the computer 16 can be located next to the refrigerator 12 to monitor food and/or drink while not being actually connected or in communication with the refrigerator 12. One method and apparatus for partially connecting and/or integrating a computer or processor with a refrigerator for specific functions is shown in U.S. patent application Ser. No. 10/344,937 which is hereby incorporated by reference herein as if fully set forth in its entirety.

In one preferred embodiment, at least one of the interior portions of the refrigerator, such as a crisper or other interior surface, includes a small data entry device 18. When food and/or drink is placed in the refrigerator, the data entry device 18 is used to enter the type of food and/or drink that is being positioned in the refrigerator 12 as well as some date data that will allow the relative freshness of the food and/or drink to be estimated by the processor 14 or the computer 16. For example, a user can enter the sell by date for food and/or drink that is placed in the refrigerator so that the processor and/or computer 14, 16 can monitor when the food and/or drink should be used by or discarded.

Alternatively, the user can enter the purchase date as well as the type of food and/or drink and the processor and/or computer 14, 16 can estimate the remaining useful period for the food and/or drink. When unusual food is placed in the refrigerator, the processor or computer can go online to check multiple databases 20 or servers 22 to determine how long the food and/or drink can be expected to last. Additionally, the processor and/or computer 14, 16 (for simplicity, the term "processor 14" is hereinafter defined as meaning "any known processor and/or computer 14, 16") can include algorithms and formulas to allow the expected period of usefulness (i.e., for how long the food and/or drink can be safely consumed) to be adjusted depending on the temperature of the refrigerator 12. Methods and apparatuses for entering data into a computer or processor are shown in U.S. patent application Ser. Nos. 10/614,091 and 09/901,595; each of which are hereby incorporated by reference herein as if fully set forth in their entirety.

A bar code reader 24 can be positioned in or by the refrigerator 12 to allow the food and/or drink data to be automatically collected by the refrigerator 12 and stored in the processor 14 when a user properly moves the food and/or drink past the bar code reader 24. The bar code reader 24 can be combined with any other data entry device 18 to allow multiple ways of entering food and/or drink data in the processor 14. One method and apparatus for scanning bar codes is shown in U.S. patent application Ser. No. 09/973,303 which is hereby incorporated by reference herein as if fully set forth in its entirety. Alternatively RFID tags placed on food and/or drink items can be used to provide data to the processor 14. This results in the "smart" refrigerator keeping a running inventory of all items in the refrigerator that is automatically updated when new items having RFID tags are inserted into or removed from the refrigerator 12.

In another preferred embodiment, an audible or visual indicator 26 can alert a user when food and/or drink in the refrigerator is nearing the end of its expected period of usefulness. The indicator 26 can be any combination of a light, an audible alarm, a synthesized voice, or text that is displayed on a display device 28 that is integrated with the refrigerator or attached to a connected or separate computer system 16. One method and apparatus for placing a display device on a refrigerator is shown in U.S. patent application Ser. No. 09/527,368 which is hereby incorporated by reference herein as if fully set forth in its entirety.

In another embodiment, the system 10 may also provide a print out of food and/or drink that is nearing the end of the expected period of usefulness. Another feature of the system 10 of the present invention is the ability of the processor 14 to access recipes that are stored on the processor 14 which include those food and/or drink items that are nearing the end of their expected period of usefulness. This makes using up leftover food and/or drink a fun exercise that can involve trying new and exciting recipes. Additionally, the system 10 can automatically access online databases 20 to update and/or download additional recipes. The user can also use the data entry device 18 to request recipes of a specific genre that use the food and/or drink items that are near the end of their expected period of usefulness. For example, the user can request that the processor 14 go online to find Chinese, Italian, Russian, Peruvian, barbeque, low-fat, and/or any other genre of recipes that incorporate those food and/or drink items that should be consumed in the near future. One method and apparatus for connecting and/or communicating between a processor and a computer network is shown in U.S. patent application Ser. No. 09/845,815 which is hereby incorporated by reference herein as if fully set forth in its entirety. A user can preferably contact the processor 14 by telephone or the Internet to identify a recipe and quantity of food to be prepared. For example, a user can access the processor 14 over the internet using a terminal, a personal digital assistant, PDA, email, or the like. Then, the processor 14 can determine whether all the needed ingredients are present in the refrigerator 12 or cupboards and can preferably automatically place an order with a selected supermarket for any missing ingredients. This allows one to plan last minute meals without having to inventory the contents of the refrigerator 12.

Additionally, a user can enter the type of food being prepared and the system 10 can alert the user to any food and/or drink items that need to be used which are nearing the end of their expected period of usefulness. For example, one may be making spaghetti and meatballs and not realize that some squash is located in the back of the crisper that is about to spoil. When beginning to cook, the user enters spaghetti and meatballs into the data entry device 18. When the processor 14 reviews the contents of the refrigerator 12, the processor determines that squash is about to go bad, and an audible or visual alert is provided to the user, letting him or her know that some squash in the refrigerator 12 may be a good addition to the spaghetti sauce. Additionally, the processor 14 can use remote data entry devices that are located in cupboards to keep track of ingredients that are stored in the kitchen outside of the refrigerator. This data can be used by the processor to alert a user as to additional potential recipes of interest. Alternatively, the processor can preferably provide a list of all items in the refrigerator 12 and/or cupboards with any desired associated information, such as quantity or expected expiration dates.

The system 10 also simplifies shopping. When it is time to go shopping, a user can enter into the processor that a trip needs to be planned and how long it may be before another subsequent shopping trip takes place. When this data is entered, the processor 14 reviews the contents of the refrigerator and prints out or displays a list of items that may need to be replaced prior to the subsequent shopping trip. This can prevent one from failing to buy milk because there is milk in the refrigerator (which is nearing the end of its expected period of usefulness) when one does not plan to return to the grocery store after the day's grocery shopping for two weeks (which may be a week after the milk would have expired).

The system 10 preferably includes an organization function that can be integrated with the processor 14 or other memory device that keeps track of upcoming events. For example, if one's child has to bring cupcakes to school on Tuesday and a dinner party is being held on a Friday, the processor 14 can provide alerts a predetermined amount of time in advance reminding the user that certain ingredients need to be obtained beforehand. To elaborate on the above example, when the user selects cupcakes, the processor 14 can check the Internet or stored recipes and provide sample recipes that can also be ranked based on the currently available ingredients; when selecting the dinner party icon, the processor 14 can suggest recipes based on current ingredients. Additionally, the processor can store preselected themes, such as a Mexican dinner, holiday dinners, religious meals, or a wine and cheese cocktail party theme, that can be used to facilitate menu generation.

The system 10 processor 14 can also monitor and/or access on command store websites, internet databases, and online circulars, servers 20, and/or supermarket servers 30 for coupons and/or sales for various food and/or drink items. The term "grocery data site", as used in the claims and corresponding portions of the specification, "refers to any or more of store websites, internet databases, and online circulars, servers 20, and/or supermarket servers 30". When the processor detects a coupon and/or sale for an item that meets a parameter, an alert can be provided to the user via email, telephone, speaker, display device 28, or the like. Parameters that can be used are, but are not limited to: identifying coupons and/or sales for exact food and/or drink products currently in the refrigerator or purchased within a predetermined recent period of time (such as within the last three months); identifying coupons and/or sales for similar food and/or drink products currently in the refrigerator or purchased within a predetermined recent period of time (such as within the last six months); coupons and/or sales that relate to an upcoming meal; coupons that relate to a favorite recipe. When a coupon and/or sale is identified, a copy of the sale advertisement or coupon may be printed out by a printer that is integrated into the system 10. Alternatively, a printable copy can be included in an email sent to the user for later printing and use. This prevents a user from having to monitor store ads and websites to take advantage of sales and/or coupons. Those of ordinary skill in the art will appreciate from this disclosure that any suitable parameter can be used with this system 10 to identify any coupons and/or sales of interest without departing from the scope of the present invention. For example, a user can instruct the system to look for particular items, to compare prices of different food items, to compare prices of different food items after taking into account sales and/or coupons, to compare discounts on various items based on sales and/or discounts. It is also preferred that the system can automatically select coupons or sale items that the system automatically reorders from a store. The grocery data sites that are monitored can be selected by a user; those venues that deliver to the area or that are within a given distance, or using any desired criteria without departing from the scope of the present invention.

The system 10 can also be integrated with cooking appliances, such as stoves, microwaves, toasters, coffee makers, and the like. For example, if a dinner is scheduled for 8 PM, the processor 14 can place an order at a supermarket for missing ingredients and automatically start preheating the oven while a user drives to the supermarket from the office.

The system 10 can be integrated with speakers and music players or online music databases to provide coordinated music during cooking and/or eating. For example, the processor 14 can identify Italian opera pieces over the Internet while a user is preparing Italian food so that the music can be played to complement the occasion. The processor 14 can preferably also look up decorating ideas that match the theme of a meal. For example, the type of table settings, centerpieces, wall decorations, or the like can be suggested by the processor 14. The processor 14 can also be linked with televisions or other monitors to provide coordinated pictures that relate to the culture from which a meal or theme originates.

Additionally, multiple systems 10 used by separate households can be linked to allow recipe and theme exchanges and the coordination of potluck type meals. For example, when planning a Mexican dinner, the systems 10 can use a common theme and select the individual dishes to be prepared by separate households based on maximizing the use of each household's current food inventory. Alternatively, if people are planning on cooking the entire meal at a single location, then the systems 10 can coordinate to advise guests which ingredients they should bring with them.

In addition, when a food and/or drink item is fully used, the data entry device 18 can be used to enter the information in the processor 14 to allow the automated generation of a shopping list. Additionally, the processor 14 can automatically place the order electronically with a supermarket server 30 or fax machine 30 so that the replacement of the necessary food and/or drink items is greatly simplified.

The system 10 also allows a user to remotely call/contact and access the system via a telephone or Internet connection to determine whether any food and/or drink items need to be purchased. This allows one to check while driving to the store or before leaving work. Additionally, the system 10 can be set so that the processor 14 sends emails or leaves voicemails at certain times of the day which can contain any pertinent information, such as recipes that incorporate food and/or drink items nearing the end of their expected period of usefulness so that one can make any necessary plans while still at the office or otherwise remote from the refrigerator 12.

It is recognized by those skilled in the art, that changes may be made to the above-described embodiments of the present invention without departing from the broad inventive concept thereof. It is understood, therefore, that this invention is not limited to the particular embodiments disclosed, but is intended to cover all modifications which are within the spirit and scope of the invention as defined by the appended claims.

I claim:

1. A method of at least one of handling and organizing at least one of food and drink, comprising the steps of:
    providing a refrigerator and an associated processor in communication with a data entry device;
    placing an item of at least one of food and drink in the refrigerator;
    communicating data corresponding to the item via a data entry device in communication with the associated processor;

automatically monitoring at least one grocery data site for at least one of a coupon and a sale relating to the item.

2. The method of claim 1, further comprising generating an alert when the at least one of the coupon and the sale relating to the item is identified.

3. The method of claim 1, wherein the step of automatically monitoring further comprises monitoring for the at least one of the coupon and the sale of an item exactly matching the item in the refrigerator.

4. The method of claim 1, further comprising:
monitoring an expected period of usefulness for the item by the associated processor;
wherein the step of automatically monitoring further comprises monitoring for the at least one of the coupon and the sale of the item that has past its expected period of usefulness.

5. The method of claim 1, wherein the processor automatically contacts a supermarket when one of the items needed for a recipe is missing and places an order with the supermarket and there is at least one of a coupon and a sale for the one of the items.

6. The method of claim 1, wherein the processor automatically contacts a supermarket when one of the items needed for a recipe needs to be replaced and places an order with the supermarket.

7. The method of claim 1, further comprising, checking the at least one of the food and the drink that is contained in the refrigerator via the associated processor to determine whether there are any items that are nearing the end of their expected period of usefulness for which at least one of the coupon and the sale has been identified.

8. The method of claim 7, further comprising, checking at least one of the food and the drink that is contained in a cupboard via the associated processor to determine whether there are any items that are nearing the end of their expected period of usefulness which can be incorporated into a meal.

9. A method of at least one of handling and organizing at least one of food and drink, comprising the steps of:
providing a refrigerator and an associated processor integrated therewith in communication with a data entry device;
placing an item of at least one of a food and a drink in the refrigerator;
entering data identifying the item via the data entry device in communication with the associated processor;
monitoring an expected period of usefulness for the item by the associated processor; and
sending at least one notification email when the item is near the end of the expected period of usefulness.

10. The method of claim 9, wherein the step of entering data further comprises the data entry device being a bar code reader and the data is a bar code on the item.

11. The method of claim 9, further comprising estimating an expected period of usefulness for the item by the associated processor, wherein the associated processor derives the expected period of usefulness based on the identity of the item and data contained on at least one of the associated processor, a remote database, and a remote server.

12. The method of claim 9, wherein the associated processor automatically contacts a supermarket when the item needs to be replaced and places an order with the supermarket.

13. The method of claim 9, further comprising the associated processor also maintaining an inventory of ingredients that are stored in cupboards.

14. A method of at least one of handling and organizing at least one of food and drink, comprising the steps of:
providing a refrigerator and an associated processor in communication with a data entry device;
providing speakers in communication with the processor
placing an item of at least one of a food and a drink in the refrigerator;
entering data corresponding to the item via the data entry device;
entering genre data corresponding to a genre of food for which a meal is to be made;
playing of music via the speakers, at the direction of the processor, that is related to the genre of food.

15. The method of claim 14, further comprising identifying suitable music from at least one of music made available on at least one of the processor, an online database, and a music player in communication with the refrigerator.

16. A method of at least one of handling and organizing at least one of food and drink, comprising the steps of:
providing a refrigerator and an associated processor in communication with a data entry device;
placing an item of at least one of food and drink in the refrigerator;
communicating data corresponding to the item via a data entry device in communication with the associated processor;
entering data into the processor regarding an upcoming event and at least one recipe to be prepared for the event; and
automatically determining which ingredients need to be purchased to prepare the recipe by the processor at a predetermined time prior to the upcoming event.

17. The method of claim 16, wherein the predetermined time is between 1 hour and three days.

18. The method of claim 16, further comprising providing an alert at the predetermined time notifying of any ingredients that need to be purchased.

19. The method of claim 18, further comprising monitoring an expected period of usefulness for the item and adding items to the alert that are present in the refrigerator buy past the expected period of usefulness.

20. The method of claim 16, wherein the step of entering date further comprises the recipe being selected from a collection of recipes located on at least one of the processor and the Internet.

* * * * *